3,006,881
POLYMERIZATION OF FLUORINE SUBSTITUTED OLEFINS IN THE PRESENCE OF PERFLUORO-CHLORO-CARBOXYLIC ACIDS AND SALTS THEREOF, AND RESULTING LATEX
Archibald N. Bolstad, Afton, Minn., and Fred W. West, Wayne, N.J., assignors to Minnesota Mining and Manufacturing Company, St. Paul, Minn., a corporation of Delaware
No Drawing. Filed May 14, 1958, Ser. No. 735,133
11 Claims. (Cl. 260—29.6)

This application is a continuation-in-part of copending U.S. Serial No. 452,702, filed August 27, 1954, now abandoned.

This invention relates to a process for the polymerization of halogenated olefins in aqueous media. In one aspect, it relates to the emulsion polymerization of fluorine-containing olefins such as chlorotrifluoroethylene using a fluorochloro dispersing agent.

The advantages of polymerizing halogenated olefins in aqueous dispersions are well-known. However, until recently, it has not been possible to polymerize halogenated olefins, such as tetrafluoroethylene or chlorotrifluoroethylene, in fine dispersions, due to the fact that satisfactory dispersing agents were unknown.

It has recently been suggested that stable aqueous colloidal dispersions of polymerized halogenated olefins could be prepared by polymerizing the fluorinated monomer in the presence of a polyfluoroalkanoic acid or salt which contains only fluorine substituents. However, when such perfluoro acids and salts are present during the polymerization reaction, they tend to exert an inhibiting effect on the reaction, often resulting in reduced yields of polymer. Such perfluoro acids and salts additionally have been found to be relatively incompatible with the solid polymer and are difficult to remove or recover from the polymeric product.

It has now been found that certain materials have the unique and improved properties of dispersing halogenated olefins, such as tetrafluoroethylene or chlorotrifluoroethylene in aqueous media satisfactory for polymerization without the above disadvantages.

It is an object of this invention to provide a process for the polymerization of halogenated olefins in aqueous media, utilizing as the dispersing agent a previously unavailable class of fluorochloro acids and derivatives.

It is a further object of this invention to provide an improved process for polymerizing chlorotrifluoroethylene in an aqueous medium, such process leading to stable dispersions of high molecular weight polychlorotrifluoroethylene.

It is a further object of this invention to provide a fluid stable latex of polychlorotrifluoroethylene which can be stored without coagulation.

It is a further object of this invention to provide a fluid stable latex of polychlorotrifluoroethylene which can be applied directly for the casting of strong flexible self-supporting films, or for the coating of metal and other surfaces, and for the impregnation of fibrous materials.

Still another object of this invention is to provide an improved process for the production of a stable latex of polychlorotrifluoroethylene, such latex having improved properties and being more homogeneous than that formed when a polyfluoroalkanoic acid is used as the dispersing agent under the same polymerization conditions.

Other objects and advantages will become apparent from the description and disclosure of the invention.

These and other objects are accomplished by polymerizing a halogenated olefin, which is at least half fluorinated and which contains from 2 to 5, preferably from 2–3, carbon atoms, in an aqueous medium which contains, as a dispersing agent, an aliphatic perfluorochloro acid produced by hydrolyzing a telomer of chlorotrifluoroethylene, or a water-soluble inorganic salt of such an acid to produce a solid polymerization product in the form of a dispersion.

Acids produced from chlorotrifluoroethylene telomers by hydrolysis may be represented by the generic formula $$Z(CF_2CFCl)_{n-1}CF_2COOH$$

wherein $n$ is an integer from 2 to 16 and wherein Z is a monofunctional radical of the group consisting of a perhalogenated radical having a total atomic weight of not higher than 146.5 and a halogen atom selected from the group consisting of fluorine, chlorine and bromine atoms.

These aliphatic perfluorochloro acids may be prepared by the hydrolysis with fuming sulfuric acid of a bromotrichloromethane telomer of chlorotrifluoroethylene or a sulfuryl chloride telomer of chlorotrifluoroethylene. The preferred telomer acids are those containing from 6 to 12 carbon atoms.

A suitable perfluorochloro acid may be prepared by the treatment with fuming sulfuric acid of a bromotrichloromethane telomer of chlorotrifluoroethylene. The telomer, having the formula $CCl_3(CF_2-CFCl)_nBr$, wherein $n$ is an integer from 2 to 16, preferably from 3–6, may be prepared in a specific example by dissolving 3.5 parts of benzoyl peroxide in 408 parts of bromotrichloromethane and charging this solution to a pressure vessel along with 300 parts of chlorotrifluoroethylene. The system is heated for about four hours at about 100° C. with agitation to produce high yields of relatively low molecular weight polymers having the above formula. These polymers may be distilled to produce individual compounds of the above formula wherein $n$ is a particular integer. The mixed polymer, or any fraction thereof, is treated with fuming sulfuric acid containing less than about 20% excess sulfur trioxide at a temperature between about 125° C. and about 175° C. for a period of time between about 10 hours and 25 hours to produce monocarboxylic acids having an odd number of carbon atoms in the aliphatic chain with the structure $CCl_3(CF_2-CFCl)_{n-1}CF_2COOH$. A detailed description of this method of preparing perfluorochloro acids may be found in the copending application of William S. Barnhart and Robert H. Wade, application Serial No. 452,703, filed August 27, 1954, now U.S. Patent No. 2,806,865.

Still another suitable perfluorochloro acid may be prepared by the treatment with fuming sulfuric acid of a sulfuryl chloride telomer of chlorotrifluoroethylene; this telomer having the formula $Cl-(CF_2CFCl)_n-Cl$, wherein $n$ is an integer from 2 to 16, preferably from 3–6, may be prepared in a specific example by dissolving 3.5 parts of benzoyl peroxide in 308 parts of carbon tetrachloride and 135 parts of sulfuryl chloride, adding 116 parts of chlorotrifluoroethylene and heating at about 95° C. for a period of four hours. The telomers may be distilled to individual compounds wherein $n$ is a particular integer. The mixed telomer, or any fraction thereof, is treated with fuming sulfuric acid containing from 0 to 20% excess sulfur trioxide at a temperature between about 140° C. to about 210° C. for a period of time ranging from 5 to 25 hours to produce monocarboxylic acids of the formula $$Cl(CF_2-CFCl)_{n-1}CF_2-COOH.$$

A detailed description of this method of producing perfluorochloro acids may be found in the copending application of William S. Barnhart and Robert H. Wade, application Serial No. 452,705, filed August 27, 1954, now U.S. Patent No. 2,806,866.

In addition to the acids, alkali metal, such as sodium,

-potassium, etc. and amine and ammonium salts of the above acids may also be used.

The monomers which may be polymerized, in accordance with this invention, include, in addition to the tetrafluoroethylene and chlorotrifluoroethylene mentioned above, other fluorine substituted olefins containing from 2 to 5 carbon atoms, particularly those containing at least 50% of fluorine substituents. These polymers may be homopolymerized or copolymerized in accordance with this invention. Among the specific monomers which may be homopolymerized are tetrafluoroethylene, chlorotrifluoroethylene, and vinylidene fluoride. Those that may be copolymerized in accordance with this invention include the above and additionally dichlorodifluoroethylene (symmetrical and unsymmetrical), perfluoropropene, trichlorofluoroethylene, etc., any of which may be copolymerized with each other or with another halogenated olefin. The invention is particularly useful in the homopolymerization of chlorotrifluoroethylene to produce a high molecular weight plastic with a high no strength temperature, such as 250 and above, particularly 290 and above; in the copolymerization of chlorotrifluoroethylene and vinylidene fluoride to produce resins and elastomers; and in the copolymerization of perfluoropropene and vinylidene fluoride to produce resins and elastomers.

The polymerization of the monomers in accordance with this invention requires an aqueous medium, a dispersing agent of the class discussed above, and a polymerization initiator, such as a water-soluble inorganic polymerization initiator, e.g. the ammonium and alkali metal persulfates, perborate or percarbonates, or an organic peroxide, such as cumene hydroperoxide. The preferred polymerization initiators or promoters are ammonium persulfate and alkali metal persulfates, particularly sodium or potassium persulfate. However, it is also within the scope of this invention to use ultraviolet light as the initiator.

When polymerization is carried out at low temperatures as preferred when homopolymerizing chlorotrifluoroethylene to a resin of high no strength temperature, it may be desirable to include, in addition to the aforesaid polymerization initiator, a reductant such as ammonium or a water-soluble alkali metal salt of a readily oxidizable sulfoxy compound, such as sodium sulfite, sodium bisulfite, sodium thiosulfate and sodium hydrosulfite. In addition, it may also be desirable when polymerizing at low temperatures, below about 50° C., to include a small amount of a water-soluble salt of a metal capable of change of valence, as, for example, a silver, copper or ferrous salt, such as ferrous sulfate. The polymerization medium may also include buffers such as borax, disodium phosphate, ammonium carbonate or sodium acetate. It is a particularly preferred embodiment, however, to omit both the reductant and the metal salt, as their use tends to discolor the product.

The polymerization process is preferably carried out in accordance with this invention at high pH, such as pH 7–13, and at temperatures from about 0 to about 50 or 60° C. for solid polymers, using pressures from atmospheric to about 1000 atmospheres. Higher temperatures may be used in some instances depending on the molecular weight of the product desired.

The concentration of fluorinated olefin in the aqueous dispersion may vary from about 5 to about 50 percent by weight of the water present. The dispersing agent may be present in concentrations from about 0.1% to about 6 percent by weight of the water present. The polymerization initiator or promoter may be present in concentrates from about .001% to about 5%, based on the weight of monomer used. The salt of the variable valence metal is usually present, when used, in an amount to provide from 0.2 to 600 parts per million of ferrous ions based on the weight of the aqueous medium; and the reductant, when used, is usually present in an amount from 1 to 6 parts by weight per 100 parts of total monomer, usually in equal amounts with the promoter.

Polymerization generally takes place over a period of time ranging from 20 minutes to 100 hours and produces conversions up to 100% of the monomer feed.

The dispersions of the present invention may be stored as such or, if desired, the polymer produced may be recovered therefrom by coagulating the dispersion with a strong mineral acid, such as hydrochloric acid or sulfuric acid, or with a salt solution such as sodium or magnesium chloride or aluminum sulfate, and then filtering, washing and drying. Because of its high effectiveness and low cost, magnesium chloride is the preferred coagulating agent. In this respect, it has been found that the magnesium salt of perfluorochloro acids is readily soluble in hot water and may be easily removed from the coagulated resin by washing in hot water. This contrasts with the insolubility of magnesium salts of comparable perfluoro acids which cannot be removed from coagulated resins by washing.

A particular advantage of the product dispersions obtained by the method of this invention when chlorotrifluoroethylene is polymerized, is that the latex product may be used directly as a coating dispersion, since it contains nothing which would be detrimental in a coating or film. Polymerization initiators, etc. are present in extremely small concentrations and normally would not affect the characteristics of the coating or film. The water is, of course, volatilized off by film-forming temperatures. The perfluorochloro acids and salts used as dispersing agents may be decarboxylated at film-forming temperatures to produce normally liquid perfluorochlorinated olefins which are very similar in structure to the polychlorotrifluoroethylene resin, and which, therefore, acts as a plasticizer. This is in contrast to the perfluoro acids previously used as dispersing agents, which, when decarboxylated, produce products which are insoluble in the polymer, with a resulting lack of homogeneity in the films.

Even as salts or as free acids the perfluorochloro compounds are more compatible with the chlorotrifluoroethylene polymer than the comparable perfluoro compounds and, therefore, produce more uniform films. Another advantage of polymerization with perfluorochloro acids and salts lies in the greater volatility of the perfluoro acids which can result in bubbling in the formation of films.

The following examples are offered to illustrate the invention and are not to be construed as limiting its scope.

EXAMPLE 1

*Emulsion polymerization of chlorotrifluoroethylene*

In this example four polymerization runs were carried out in aqueous dispersion using fluorochloro telomer acid as a dispersing agent. Each polymerization was carried out in a 100 ml. heavy walled, clean and nitrogen flushed Pyrex polymerization tube, using the indicated ingredients charged in the following order:

$C_8$-perfluorochloro telomer acid, water, a 2½% solution of sodium metabisulfite ($Na_2S_2O_5$), a 2½ solution of potassium persulfate ($K_2S_2O_8$), a 1.25% solution of ferrous sulfate ($FeSO_4.7H_2O$), and chlorotrifluoroethylene.

The $C_8$ telomer acid, referred to above, is a monocarboxylic acid derived from the treatment with fuming sulfuric acid of a $C_8$ telomer prepared with sulfuryl chloride as the telogen and chlorotrifluoroethylene as the monomer. The acid has the formula $$Cl(CF_2CFCl)_3CF_2COOH$$

The polymerizations were conducted at +5° C. for 20 hours with rocking of the tube. The polymers obtained were then oven dried overnight at 190° C. The results of these experiments are shown in Table I below:

conversion. Based on carbon analysis the final polymer had a $CF_2=CH_2/CF_3CF=CF_2$ ratio of 68/32.

TABLE I

| Experiment Number | Pts. by Wt. $CF_2=CFCl$ | Pts. by Wt. Water | Initial pH * | Pts. by Wt. $K_2S_2O_8$ | Pts. by Wt. $Na_2S_2O_5$ | Pts. per million (p.p.m.) of monomer $FeSO_4.7H_2O$ | Pts. by Wt. Cotelomer acid | Percent Yield |
|---|---|---|---|---|---|---|---|---|
| 1 | 100 | 300 | 2.0 | 2.0 | 1.1 | 300 | None | 6.4 |
| 2 | 100 | 300 | 2.0 | 2.0 | 1.1 | 30 | 0.4 | 12.0 |
| 3 | 100 | 300 | 2.0 | 2.0 | 1.1 | 100 | 0.4 | 12.5 |
| 4 | 100 | 300 | 2.0 | 2.0 | 1.1 | 300 | 0.4 | 14.4 |

* pH was adjusted using a 5% solution of KOH.

NOTE:
2.0 parts by weight of $K_2S_2O_8$=40.0 ml. of 2.5% $K_2S_2O_8$.
1.1 parts by weight of $Na_2S_2O_5$=20.0 ml. of 2.5% $Na_2S_2O_5$.
100 p.p.m. of $FeSO_4.7H_2O$=1.0 ml. of 1.25% $FeSO_4.7H_2O$.
0.4 parts by weight of $C_8$-acid=0.15 grams of acid.
100 parts by weight of monomer=41.7 grams of $CF_2=CFCl$.

EXAMPLE 2

*Emulsion polymerization of chlorotrifluoroethylene*

In this example four polymerization runs were carried out in aqueous dispersion, using the same procedure as in Example 1 and charging the indicated ingredients:

|   | Parts by weight |
|---|---|
| Water | 300 |
| Chlorotrifluoroethylene | 100 |
| Telomer acids (neutralized with KOH) | 4.5 |
| $K_2S_2O_8$ | 2.4 |
| $Na_2HPO_4.7H_2O$ | 4.8 |

The $C_6$, $C_8$, and $C_{10}$ perfluorochloro telomer acids employed are monocarboxylic acids derived from the treatment with fuming sulfuric acid of the corresponding telomer prepared with sulfuryl chloride as the telogen and chlorotrifluoroethylene as the monomer.

The polymerizations were conducted at +25° C. for 20 hours. Results of these runs are shown in Table II below:

TABLE II

| Run | Parts by Wt. of Telomer Acid | Percent Conversion | Solution Viscosity, cs.[1] |
|---|---|---|---|
| 1 | 2.25 $C_6$+2.25 $C_{10}$ | 56.6 | 1.462 |
| 2 | 1.5 $C_8$+1.5 $C_{10}$+1.5 $C_{12}$ | 56.4 | 1.451 |
| 3 | 1.1 $C_6$+1.1 $C_8$+1.1 $C_{10}$+1.1 $C_{12}$ | 51.9 | 1.443 |
| 4 | 1.5 $C_6$+1.5 $C_8$+1.5 $C_{10}$ | 50.2 | 1.464 |

[1] 0.75% sol'n. in dichlorobenzotrifluoride.

EXAMPLE 3

*Emulsion copolymerization of perfluoropropene/vinylidene fluoride*

In this example a polymerization run was carried out using the same procedure as in Example 1 and charging the indicated ingredients:

|   | Parts by weight |
|---|---|
| Water | 150 |
| $C_8$ perfluorochloro telomer acid | 0.75 |
| $K_2S_2O_8$ | 0.75 |
| $Na_2HPO_4.7H_2O$ | 3 |
| Total monomer | 60–75 |

The mol ratio of $CF_2=CH_2/CF_3CF=CF_2$ in the total monomer charge was 70/30. Polymerization was conducted at 50° C. for 22 hours, producing a 76%

EXAMPLE 4

*Emulsion copolymerization of $CF_2=CH_2/CF_3CCl=CF_2$*

Using the same procedure as in Example 1, the following ingredients were charged to the polymerization tube:

|   | Parts by weight |
|---|---|
| Water | 150 |
| $C_8$ perfluorochloro telomer acid | 0.75 |
| $K_2S_2O_8$ | 0.75 |
| $Na_2HPO_4.7H_2O$ | 3 |
| Total monomer | 60–75 |

The mol ratio of $CF_2=CH_2/CH_3CCl=CF_2$ in the total monomer charge was 60/40. Polymerization for 25 hours at 50° C. produced a low molecular weight polymer product.

EXAMPLE 5

*Emulsion polymerization of chlorotrifluoroethylene*

Using the same procedure as in Example 1, the following ingredients were charged to the polymerization tube:

|   | Parts by weight |
|---|---|
| Water | 300 |
| $C_6$ perfluorochloro telomer acid | 60 |
| $K_2S_2O_8$ | 2.4 |
| $Na_2HPO_4.7H_2O$ | 4.8 |
| Chlorotrifluoroethylene monomer | 100 |

The polymerization was conducted at 25° C. for 20 hours, with a resulting conversion of 73.5%. The polymer had a zero strength temperature of 358° C. and a solution viscosity in dichlorobenzotrifluoride (0.75%) of 1.276 cs.

EXAMPLE 6

*Emulsion polymerization of $CF_2=CFCl/CF_2=CH_2$*

Polymerization runs were made at 25° C. using the following ingredients:

|   | Parts by weight |
|---|---|
| Water | 300 |
| Total monomers | 100 |
| $K_2S_2O_8$ | 2.4 |
| $Na_2HPO_4.7H_2O$ | 4.8 |

The polymerization time was 20 hours. Total monomers included 40.8 grams (95.0 mol percent) of $$CF_2=CFCl$$

and 0.92 gram (4.0 mol percent of $CF_2=CH_2$ using a procedure similar to that of Example 1, the following results were obtained.

TABLE III

| Run | Pts. by Wt. C₈ perfluorochloro telomer acid | Percent Conversion | Dilute Sol'n. Viscosity, cs.¹ | Mol percent CF₂=CH₂ combined ² |
|---|---|---|---|---|
| 1 | 3.0 | 88.8 | 2.421 | 4.1 |
| 2 | 2.25 | 84.0 | 2.369 | 4.1 |
| 3 | 1.50 | 74.1 | 2.479 | 4.1 |

¹ 0.75% in dichlorobenzotrifluoride at 266° F.
² Infra red analysis.

EXAMPLE 7

*Emulsion polymerization of chlorotrifluoroethylene/vinylidene fluoride*

The following mixture was charged into a steel cylindrical bomb: water, 200 parts by weight; monomers (75 mole of trifluorochloroethylene and 25 mols of vinylidene fluoride); potassium persulfate, 1 part; sodium bisulfite, 0.4 part; ferric sulfate, 0.1 part; and $C_8$ fluorochlorocarbon monobasic telomer acid, 1 part (1 gram). Polymerization was conducted at ambient temperature and 75 pounds per square inch gauge pressure with rocking of the bomb.

A latex containing polymer was produced and coagulated, washed and dried. The total yield corresponded to a 91% conversion.

EXAMPLE 8

*Emulsion polymerization of vinylidene fluoride*

The following mixture was charged into a steel Aminco cylindrical bomb: water, 200 parts by weight; monomer (vinylidene fluoride), 50 parts; potassium persulfate, 1 part; sodium bisulfite, 0.4 part; ferric sulfate, 0.1 part; and $C_8$ fluorochlorocarbon telomer acid, 1 part. Polymerization was conducted at ambient temperature and 100 pounds per square inch gauge pressure with rocking of the bomb. The $C_8$ fluorochlorocarbon telomer acid used (1.0 gram) was obtained by treating sulfuryl chloride-trifluorochloroethylene telomer oil with fuming sulfuric acid. An 83% yield of powdered polymer was obtained.

We claim:

1. A process for preparing a polymer of ingredients consisting of a halogen-substituted olefin in which at least half of the substituents attached to carbon are fluorine atoms and which contains from 2 to 5 carbon atoms, which comprises polymerizing said halogen-substituted olefin in the presence of a polymerization initiator in an aqueous medium containing a dispersing agent selected from the group consisting of saturated aliphatic perfluorochloromonocarboxylic acids which have between 4 and 33 carbon atoms and which are prepared by hydrolyzing a telomer of trifluorochloroethylene, and the water soluble inorganic salts of the aforesaid acids.

2. The process of claim 1 in which the perfluorochloromonocarboxylic acids contain from 6 to 12 carbon atoms.

3. The process of claim 1 wherein the halogen-substituted olefin is chlorotrifluoroethylene.

4. The process of claim 1 wherein the halogen-substituted olefin is a mixture of chlorotrifluoroethylene and vinylidene fluoride.

5. The process of claim 1 wherein the halogen-substituted olefin is a mixture of perfluoropropene and vinylidene fluoride.

6. The process of claim 1 in which the polymerization initiator is an inorganic persulfate.

7. The process of claim 1 in which said aqueous medium contains an inorganic peroxy compound and a reductant.

8. A stable polymer latex which comprises (1) a polymer of ingredients consisting of a halogen-substituted olefin in which at least half of the substituents attached to carbon are fluorine atoms and which contains from 2 to 5 carbon atoms, said polymer being in a state of fine subdivision, (2) water, and (3) a dispersing agent selected from the group consisting of saturated aliphatic perfluorochloromonocarboxylic acids which have between 4 and 33 carbon atoms and which are prepared by hydrolyzing a telomer of trifluorochloroethylene, and the water soluble inorganic salts of the aforesaid acids.

9. The stable latex of claim 8 in which said polymer is a copolymer of perfluoropropene and vinylidene fluoride.

10. The stable latex of claim 8 in which said polymer is a chlorotrifluoroethylene homopolymer.

11. The stable latex of claim 8 in which said polymer is a copolymer of chlorotrifluoroethylene and vinylidene fluoride.

References Cited in the file of this patent

UNITED STATES PATENTS

| | | |
|---|---|---|
| 2,612,484 | Bankoff | Sept. 30, 1952 |
| 2,766,215 | Stoops et al. | Oct. 9, 1956 |
| 2,874,152 | Bolstad et al. | Feb. 17, 1959 |